(12) United States Patent
Umemoto et al.

(10) Patent No.: US 7,148,667 B2
(45) Date of Patent: Dec. 12, 2006

(54) POWER SUPPLY APPARATUS

(75) Inventors: Kiyotaka Umemoto, Kyoto (JP); Ko Takemura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 167 days.

(21) Appl. No.: 10/822,660

(22) Filed: Apr. 13, 2004

(65) Prior Publication Data

US 2004/0207375 A1 Oct. 21, 2004

(30) Foreign Application Priority Data

Apr. 16, 2003 (JP) ............................ 2003-111242

(51) Int. Cl.
*G05F 1/40* (2006.01)
(52) U.S. Cl. .................................... 323/282
(58) Field of Classification Search ................ 323/282, 323/283, 284, 285, 351
See application file for complete search history.

(56) References Cited

U.S. PATENT DOCUMENTS 6,304,066 B1 * 10/2001 Wilcox et al. .............. 323/282
6,320,359 B1 * 11/2001 Nagaya et al. .............. 323/224
6,396,250 B1 * 5/2002 Bridge ....................... 323/283
6,496,394 B1 12/2002 Hanaoka et al.
6,861,826 B1 * 3/2005 Lynch ........................ 323/224
6,870,354 B1 * 3/2005 Nishimaki .................. 323/284
6,873,140 B1 * 3/2005 Saggini et al. ............. 323/283
6,879,137 B1 * 4/2005 Sase et al. .................. 323/282

FOREIGN PATENT DOCUMENTS

CN 1347182 A 5/2002
JP 2002-186254 6/2002

* cited by examiner

*Primary Examiner*—Adolf Berhane
(74) *Attorney, Agent, or Firm*—Arent Fox PLLC

(57) ABSTRACT

In a power supply apparatus that is so configured as to produce from an input voltage an output voltage Vo within a predetermined permissible variation range, the output voltage Vo is so controlled as to decrease within the permissible variation range as the output current Io increases. This configuration offers an output voltage with an improved transient characteristic against an abrupt variation in the output current and simultaneously permits reduction of the power consumed when the output current increases.

9 Claims, 5 Drawing Sheets

POWER SUPPLY APPARATUS

This application is based on Japanese Patent Application No. 2003-111242 filed on Apr. 16, 2003, the contents of which are hereby incorporated by reference.

BACKGROUND OF THE INVENTION

1. Field of the Invention

The present invention relates to a power supply apparatus that generates from an input voltage an output voltage that is permitted to vary within a predetermined permissible variation range.

2. Description of the Prior Art

Conventionally, in a power supply apparatus that generates from an input voltage Vi an output voltage Vo that is permitted to vary within a predetermined permissible variation range, the output voltage Vo is kept equal to a predetermined reference voltage Vref (a constant level that is not influenced by a increase or decrease in the output current Io) through the feedback control of the output voltage Vo (see FIG. 7A).

It is true that, with the power supply apparatus that performs the control described above, a load can be supplied with the output voltage Vo of the power supply apparatus as a voltage of which the variation is within the permissible variation range even when the input voltage Vi or the output current Io varies slightly.

However, in the power supply apparatus that performs the control described above, when the output current Io varies so abruptly as not to be coped with by the feedback loop of the output voltage Vo, a large variation occurs in the output voltage Vo, causing, in the worst case, the output voltage Vo to go out of the permitted variation range (see FIG. 7B). This is one problem with the conventional power supply apparatus. A solution to this problem has been becoming especially critical in recent years as semiconductor chips (such as CPUs) used as a load for such a power supply apparatus consume increasingly large currents and operates at increasingly high speeds and thus require increasingly stable output voltages Vo even in the event of an abrupt variation in the load. Moreover, in the power supply apparatus configured as described above, the feedback control is so performed that the output voltage Vo is kept equal to the reference voltage Vref that is not influenced by an increase or decrease in the output current Io. This causes the power consumption by the load to increase as the output current Io increases. This is another problem with the conventional power supply apparatus.

Various techniques have conventionally been disclosed and proposed to give a solution to the problems mentioned above (for example, see Japanese Patent Application Laid-Open No. 2002-186254). However, all of those techniques attempt to solve the problems by increasing the response of the feedback loop, and are thus basically no different from the conventional configuration described above in that they perform feedback control so that the output voltage Vo is kept at a constant level that is not influenced by an increase or decrease in the output current Io. As long as such a configuration is used, the transient characteristic of the output voltage Vo cannot be improved beyond a certain limit. That is, in the event of an abrupt variation in the output current Io, there still is a risk, in the worst case, of the output voltage Vo going out of the permitted variation range. Moreover, as the output current Io increases, the power consumption by the load still tends to increase.

SUMMARY OF THE INVENTION

An object of the present invention is to provide a power supply apparatus that offers an output voltage with an improved transient characteristic against an abrupt variation in the output current and that simultaneously permits reduction of the power consumed when the output current increases.

To achieve the above object, according to the present invention, a power supply apparatus is provided with: a circuit that produces from an input voltage an output voltage within a predetermined permissible variation range; and a circuit that, as the output current increases, decreases the target level of the output voltage within the permissible variation range.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
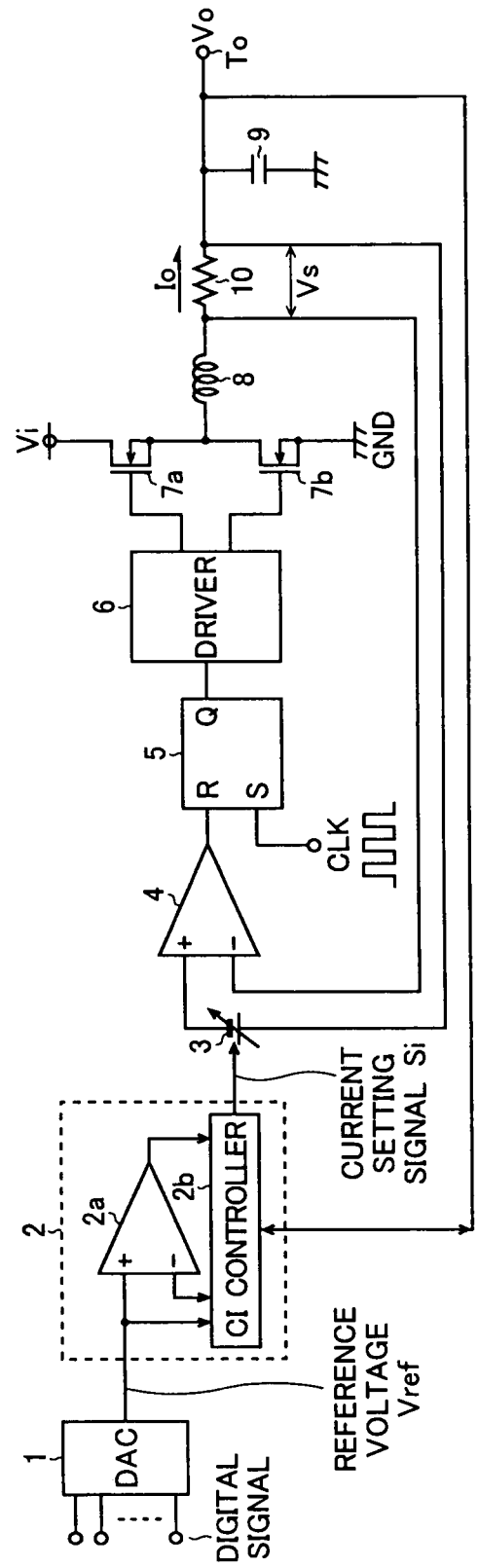
FIG. 1 is a circuit diagram showing the power supply apparatus of a first embodiment of the invention.

FIG. 1 is a circuit diagram showing the power supply apparatus of a first embodiment of the invention. As shown in this figure, the power supply apparatus of this embodiment is composed of a digital-to-analog converter 1 (hereinafter referred to as the DAC 1), an output voltage comparison circuit 2, an offset circuit 3, an output current comparator 4, a reset-priority S-R flip-flop 5, an output transistor driving circuit 6 (hereinafter referred to as the driver 6), N-channel MOS field-effect transistors 7a and 7b (hereinafter referred to as the FETs 7a and 7b), an output coil 8, an output capacitor 9, and a sense resistor 10. The power supply apparatus is designed as a DC/DC converter of a synchronous rectification type wherein a desired output voltage Vo obtained from the node between the pair of FETs 7a and 7b connected in series between two different potentials (between an input potential Vi and the ground potential GND) so as to function as switching devices is passed through an LC filter (composed of the output coil 8 and the output capacitor 9) and is then fed out via an output terminal To.

The DAC 1 converts a digital signal fed in from outside the apparatus into an analog signal to produce a reference voltage Vref with reference to which the output voltage Vo is determined. It should be noted that, when the output current Io is zero, the reference voltage Vref itself is fed out as the output voltage Vo (see FIG. 4). The output voltage comparison circuit 2 is composed of an operational amplifier 2a and a constant-impedance controller 2b (hereinafter referred to as the CI controller 2b), and produces, on the basis of the result of comparison between the reference voltage Vref and the output voltage Vo, a setting current signal Si to be fed to the offset circuit 3. The internal configuration and operation of the output voltage comparison circuit 2 will be described in detail later. On the basis of the setting current signal Si produced by the output voltage comparison circuit 2, the offset circuit 3 gives a predetermined offset between the two input terminals of the output current comparator 4.

The output terminal of the output current comparator 4 is connected to the reset input terminal (R) of the S-R flip-flop 5. The set input terminal (S) of the S-R flip-flop 5 is connected to a clock terminal to which a clock signal CLK (having a frequency of 200 [kHz] to 1 [MHz], for example) is fed, and the output terminal (Q) of the S-R flip-flop 5 is connected to the input terminal of the driver 6. The driver 6 has two output terminals, which are connected to the gates of the FETs 7a and 7b, respectively.

The drain of the FET 7a is connected to a supply voltage line, and the source of the FET 7b is grounded. The source of the FET 7a and the drain of the FET 7b are connected together, and the node between them is connected through the output coil 8 to one end of the sense resistor 10. The other end of the sense resistor 10 is connected to the output terminal To, and is also connected through the output capacitor 9 to a reference potential. The one end of the sense resistor 10 (the end thereof closer to the output coil 8) is connected to the inverting input terminal (−) of the output current comparator 4, and the other end of the sense resistor 10 (the end thereof closer to the output terminal To) is connected through the offset circuit 3 to the non-inverting input terminal (+) of the output current comparator 4. Accordingly, the output current comparator 4 changes the output level thereof according to whether or not the voltage Vs (including the offset produced by the offset circuit 3) across the sense resistor 10, which varies with the output current Io, is higher than a predetermined threshold level.

When the reset signal to the S-R flip-flop 5 is low and the set signal thereto is high, the driver 6 turns the FET 7a on and the FET 7b off. On the other hand, when the reset signal to the S-R flip-flop 5 is low and the set signal thereto is low, the driver 6 turns the FET 7a off and the FET 7b on. Incidentally, when the reset signal is high, the driver 6 turns the FET 7a off irrespective of the state of the set signal (the state of the FET 7b is indeterminate). In the configuration described above, when the voltage Vs across the sense resistor 10 reaches the predetermined threshold level, the reset signal to the S-R flip-flop 5 turns high, and thus the switching of the FET 7a is stopped.

Figure 2:
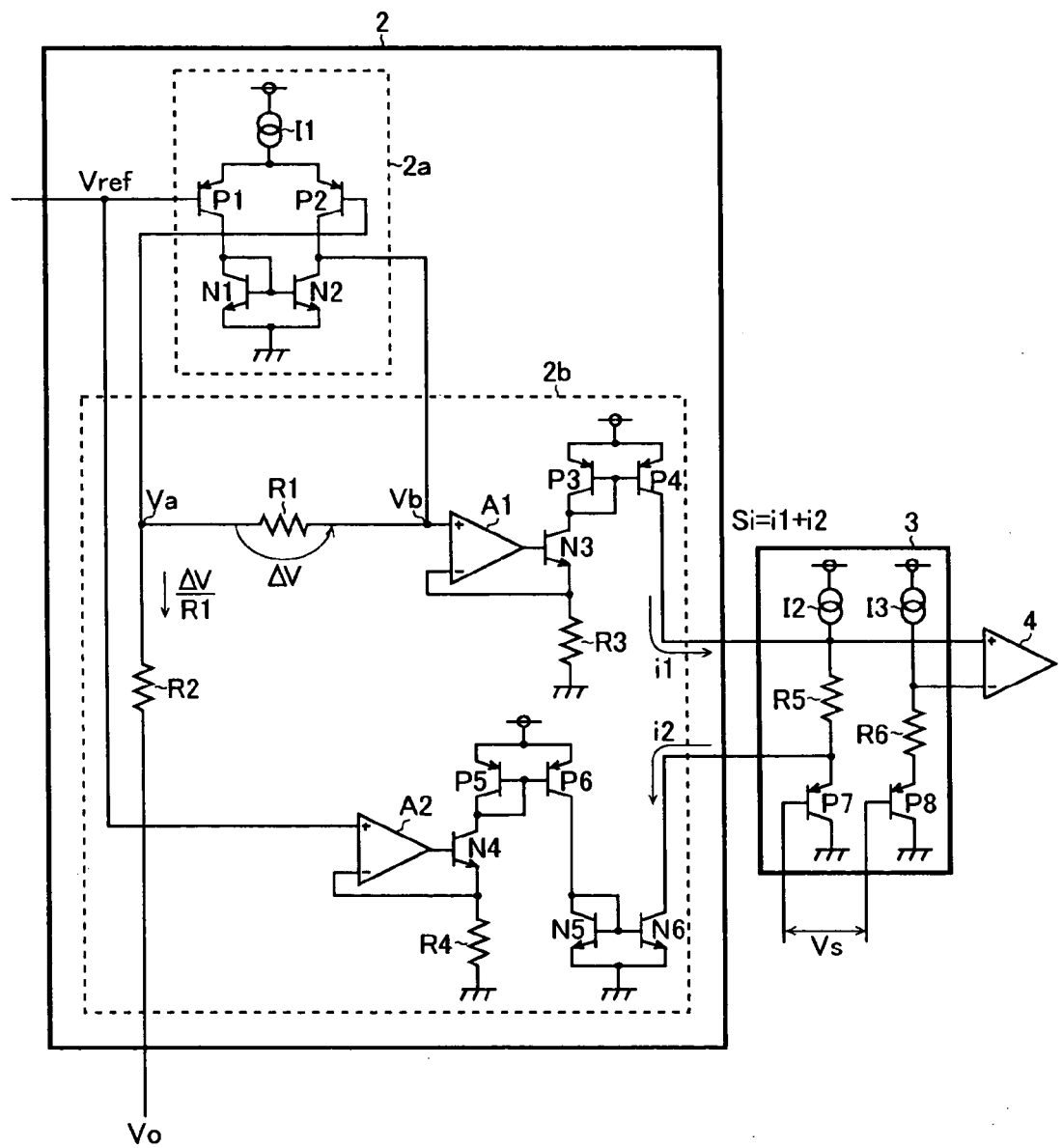
FIG. 2 is a circuit diagram showing the output voltage comparison circuit 2 and the offset circuit 3.

Next, with reference to FIG. 2, the internal configuration of the output voltage comparison circuit 2 and the offset circuit 3 will be described in detail. As described earlier, in this embodiment, the output voltage comparison circuit 2 is composed of an operational amplifier 2a and a CI controller 2b. The operational amplifier 2a is composed of pnp-type bipolar transistors P1 and P2, npn-type bipolar transistors N1 and N2, and a constant current source I1. The CI controller 2b is composed of pnp-type bipolar transistors P3 to P6, npn-type bipolar transistors N3 to N6, amplifiers A1 and A2, and resistors R1 to R4. The offset circuit 3 is composed of pnp-type bipolar transistors P7 and P8, constant current sources I2 and I3, and resistors R5 and R6.

The emitters of the transistors P1 and P2 are connected together, and the node between them is connected through the constant current source I1 to the supply voltage line. The collectors of the transistors P1 and P2 are connected to the collectors of the transistors N1 and N2, respectively. The base of the transistor P1, which serves as the non-inverting input terminal (+) of the operational amplifier 2a, is connected to the output terminal of the DAC 1 (not illustrated) so that the reference voltage Vref is applied thereto. The base of the transistor P2, which serves as the inverting input terminal (−) of the operational amplifier 2a, is connected through the resistor R1 to the non-inverting input terminal (+) of the amplifier A1, and is also connected through the resistor R2 to the output terminal To (not illustrated) of the power supply apparatus. The node between the collectors of the transistors P2 and N2, which serves as the output terminal of the operational amplifier 2a, is connected to the non-inverting input terminal (+) of the amplifier A1. The emitters of the transistors N1 and N2 are connected together, and the node between them is grounded. The bases of the transistors N1 and N2 are connected together, and the node between them is connected to the collector of the transistor N1.

The output terminal of the amplifier A1 is connected to the base of the transistor N3. The emitter of the transistor N3 is consented to the inverting input terminal (−) of the amplifier A1, and is also grounded through the resistor R3. The collector of the transistor N3 is connected to the collector of the transistor P3. The emitters of the transistors P3 and P4 are connected together, and the node between them is connected to the supply voltage line. The bases of the transistors P3 and P4 are connected together, and the node between them is connected to the collector of the transistor P3. The collector of the transistor P4 is connected through the resistor R5 to the collector of the transistor N6.

The emitters of the transistors N5 and N6 are connected together, and the node between them is grounded. The collector of the transistor N5 is connected to the collector of the transistor P6. The bases of the transistors N5 and N6 are connected together, and the node between them is connected to the collector of the transistor N5. The emitters of the transistors P5 and P6 are connected together, and the node between them is connected to the supply voltage line. The collector of the transistor P5 is connected to the collector of the transistor N4. The bases of the transistors P5 and P6 are connected together, and the node between them is connected to the collector of the transistor P5. The emitter of the transistor N4 is connected to the inverting input terminal (−) of the amplifier A2, and is also grounded through the resistor R4. The base of the transistor N4 is connected to the output terminal of the amplifier A2. The non-inverting input terminal (+) of the amplifier A2 is connected to the output terminal of the DAC 1 (see FIG. 1) so that the reference voltage Vref is applied thereto.

The two ends of the sense resistor 10 (see FIG. 1) are connected to the bases of the transistors P7 and P8, respectively. The collectors of the transistors P7 and P8 are both grounded. The emitter of the transistor P7 is connected through the resistor R5 and the constant current source I2 to the supply voltage line. The node between the constant current source I2 and the resistor R5 is connected to the collector of the transistor P4, and is also connected to the non-inverting input terminal (+) of the output current comparator 4. The node between the resistor R5 and the emitter of the transistor P7 is connected to the collector of the transistor N6. The emitter of the transistor P8 is connected through the resistor R6 and the constant current source I3 to the supply voltage line. The node between the constant current source I3 and the resistor R6 is connected to the inverting input terminal (−) of the output current comparator 4.

In the output voltage comparison circuit 2 configured as described above, as the output current Io increases and accordingly the collector current i1 of the transistor P4 increases, the inverting input voltage to the amplifier A1 provided in the CI controller 2b increases, and accordingly the non-inverting input voltage to the amplifier A1 (i.e., the output voltage Vb of the operational amplifier 2a) increases. Thus, a voltage difference ΔV commensurate with an increase or decrease in the output current Io appears across the resistor R1 between the inverting input voltage Va to the operational amplifier 2a and the output voltage Vb.

Figure 3A:
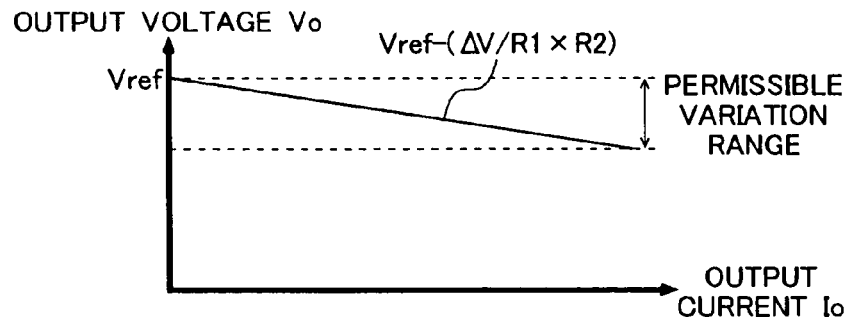
FIGS. 3A and 3B are diagrams showing the DC and transient characteristics, respectively, of a power supply apparatus embodying the invention.
Figure 3B:
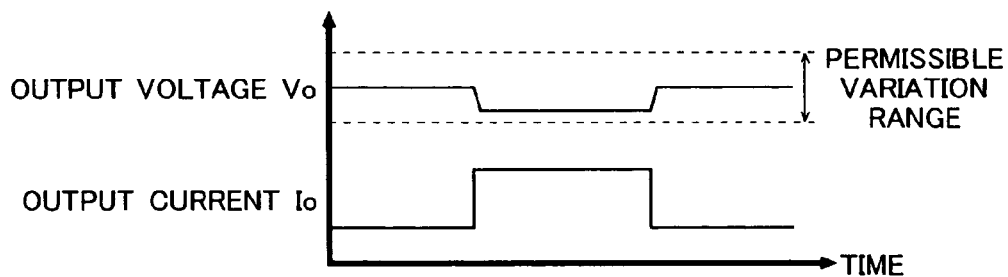

At this time, the operational amplifier 2a so operates as to make the inverting input voltage Va and the non-inverting input voltage (i.e., the reference voltage Vref) equal. This causes the current that flows from the resistor R1 to the resistor R2 to increase, and thus makes the output voltage Vo lower than the reference voltage Vref by a predetermined level (ΔV/R1×R2) (see FIG. 3A). That is, in the power supply apparatus of this embodiment, even in the event of an abrupt change in the output current Io, the output voltage Vo shifts to a voltage commensurate with the output current Io and is then kept at that voltage (see FIG. 3B). This eliminates the likeliness of a large variation appearing in the output voltage Vo, and thus helps enhance the transient characteristic of the output voltage Vo against an abrupt variation in the output current Io. Moreover, in the power supply apparatus of this embodiment, the output voltage Vo is reduced according to the increase in the output current Io. This helps reduce the power consumed when the output current Io increases.

Configured as described above, the power supply apparatus of this embodiment so operates that, as the output current Io increases, the output voltage Vo is reduced within a predetermined permissible variation range, and this can be achieved without requiring any offset to be produced in the input voltages themselves to the operational amplifier 2a. This permits the difference between the input voltages to the operational amplifier 2a to be set small. In other words, it is possible to use as the operational amplifier 2a one close to an ideal operational amplifier that receives equal potentials as the input voltages thereto. This configuration helps obtain a high gain in the operational amplifier 2a, and thus helps increase the response of the feedback loop and thereby enhance the transient characteristic of the output voltage Vo against an abrupt variation in the output current Io.

In the power supply apparatus of this embodiment, the DC characteristic (see FIG. 3A) of the output voltage Vo with respect to the output current Io can be set simply by appropriately setting the ratio between the resistances of the resistors R1 and R2, and does not depend on the gain characteristic of the operational amplifier 2a. Thus, there are very few factors that cause the output voltage Vo to vary. Accordingly, with the power supply apparatus of this embodiment, even when the permissible variation range of the output voltage Vo is narrow (for example, ±50 [mV]), the output voltage Vo can be controlled accurately to vary within the permissible variation range.

Figure 4:
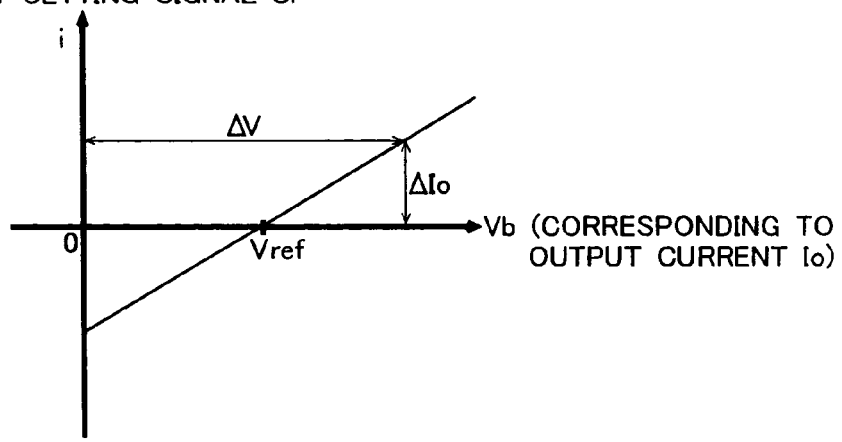
FIG. 4 is a diagram showing the correlation characteristic of the current setting signal Si with respect to the output current Io.

Moreover, in the power supply apparatus of this embodiment, used as the current setting reference voltage (corresponding to the output voltage Vb of the operational amplifier 2a as obtained when the collector currents i1 and i2 of the transistors P4 and N6 are equal and a current setting signal Si is zero; see FIG. 4) that determines the correlation between the output voltage Vb of the operational amplifier 2a (i.e., the output current Io) and the current setting signal Si (=i1+i2) is the reference voltage Vref (or a voltage produced from the reference voltage Vref), which determines the output voltage Vo. With this configuration, even if a variation occurs in the reference voltage Vref, it has no influence whatsoever on the correlation characteristic of the current setting signal Si with respect to the output current Io. This configuration is particularly suitable for a power supply apparatus, like that of this embodiment, where the reference voltage Vref is controlled to vary.

Figure 5:
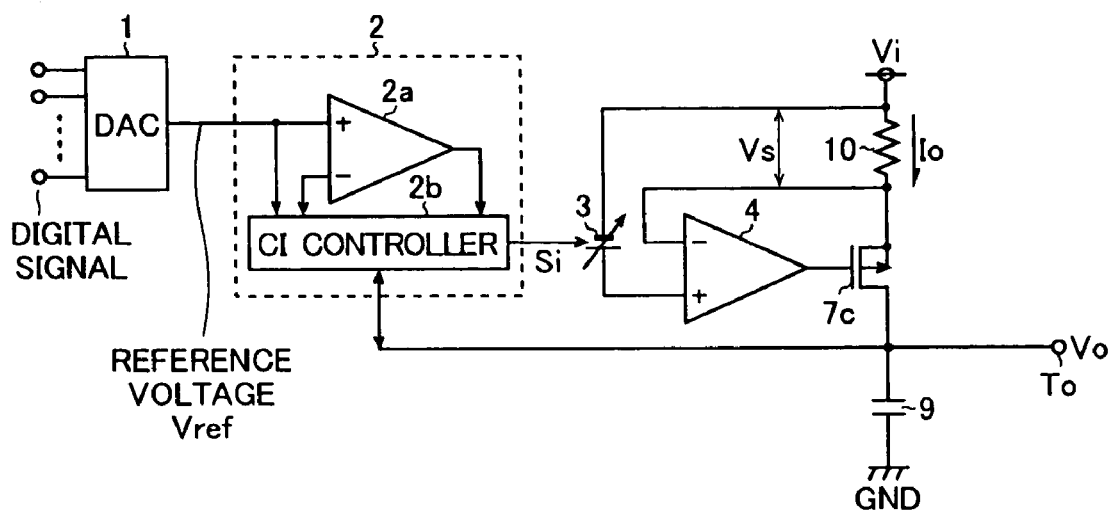
FIG. 5 is a circuit diagram showing the power supply apparatus of a second embodiment of the invention.

The embodiment described above deals with a case where the present invention is applied to a switching regulator. It should be understood, however, that the present invention can be applied to any other configuration, for example, a series regulator having an FET 7c connected in series between an input and an output terminal as shown in FIG. 5.

Figure 6:
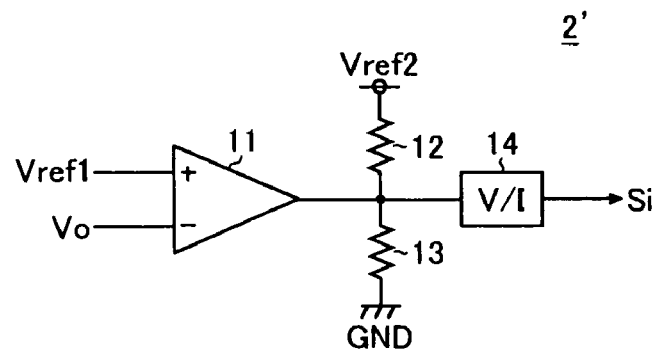
FIG. 6 is a circuit diagram showing the power supply apparatus of a third embodiment of the invention.
Figure 7A:
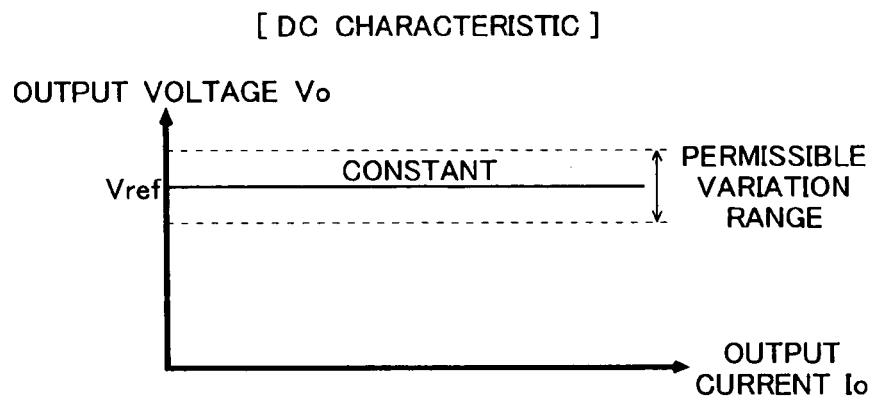
FIGS. 7A and 7B are diagrams showing the DC and transient characteristics, respectively, of a conventional power supply apparatus.
Figure 7B:
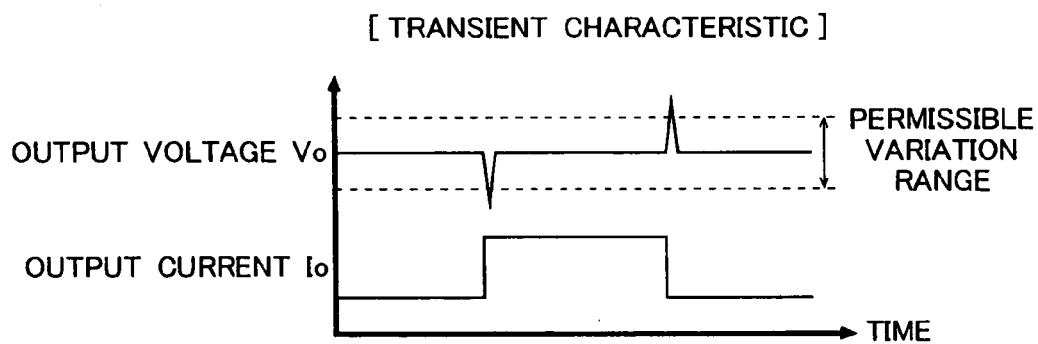

Instead of the output voltage comparison circuit 2 described above, an output voltage comparison circuit 2' as shown in FIG. 6 may be used. This output voltage comparison circuit 2' is composed of an output voltage comparison amplifier 11 that amplifies the differential voltage between a first reference voltage Vref1 and the output voltage Vo, resistors 12 and 13 that are connected in series between a previously set second reference voltage Vref2 and the ground potential GND so as to bias the voltage amplified by the output voltage comparison amplifier 11, and a voltage-to-current conversion circuit 14 that converts the amplified and then biased voltage into a current to produce a current setting signal Si. Here, by lowering the output gain of the output voltage comparison amplifier 11 according to the second reference voltage Vref2 and the resistances of the bias resistors 12 and 13, a difference commensurate with a variation in the current setting signal Si is produced between the first reference voltage Vref1 and the output voltage Vo. With this configuration, it is possible to obtain almost the same advantages as those achieved in the first and second embodiments described earlier.

It should be noted here that the power supply apparatus configured as described above, while having the advantage that it can be realized with a simpler configuration than in the first and second embodiments, has the following disadvantages: (a) a wide voltage range needs to be secured for the inputs to the output voltage comparison amplifier 11; (b) the resistances of the resistors R1 and R2 need to be set with consideration given both to their ratio (the mid-point voltage) and to their absolute values, and thus variations in those resistances have a great influence; (c) variations in the gain characteristic of the output voltage comparison amplifier 11 have a great influence, and the output voltage comparison amplifier 11 has a poor temperature characteristic; and (d) the gain of the output voltage comparison amplifier 11 needs to be set low, and thus the output voltage comparison amplifier 11 shows a poor high-speed response. Accordingly, due caution needs to be exercised when this configuration is adopted. For example, in a case where power is supplied to a load that permits the input voltage thereto to vary only within a narrow variation range, the power supply apparatus of the first or second embodiment is more suitable than the power supply apparatus of this embodiment.

The descriptions above deal only with cases where the output current of the output voltage comparison circuit 2 is converted into a voltage by the offset circuit 3. It is, however, possible to adopt any other configuration. For example, it is possible to use a digital signal as the current setting signal Si.

As described above, according to the present invention, in a power supply apparatus, to produce from an input voltage an output voltage within a predetermined permitted variation range, the target voltage of the output voltage is so controlled as to be reduced within the permissible variation range as the out current increases. More specifically, according to the present invention, a power supply apparatus is provided with: an output current detector that produces a monitoring voltage commensurate with the output current; a comparator that changes the output level thereof according to whether or not the monitoring voltage is higher than a predetermined threshold level; an output controller that controls the output voltage based on the output signal from the comparator; an offsetter that gives the monitoring voltage an offset; and an output voltage comparator that controls the magnitude of the offset according to the result of comparison between the output voltage and a predetermined reference voltage. Here, the output voltage comparator, in producing from the input voltage the output voltage within a predetermined permissible variation range, controls the magnitude of the offset in such a way that, as the output current increases, the output voltage decreases within the permissible variation range. This configuration helps enhance the transient characteristic of the output voltage against an abrupt variation in the output current and simultaneously reduce the power consumed when the output current increases.

In the power supply apparatus configured as described above, advisably, the output voltage comparator includes: an operational amplifier that operates so as to make the output voltage and the reference voltage equal; and a constant-impedance controller that controls the magnitude of the offset according to the output terminal voltage of the operational amplifier and that produces a signal by which the target level of the output voltage is reduced within the permissible variation range as the output current increases. With this configuration, the power supply apparatus so operates that, as the output current increases, the output voltage is reduced within the predetermined permissible variation range, and this can be achieved without requiring any offset to be produced in the input voltages themselves to the operational amplifier. This permits the difference between the input voltages to the operational amplifier to be set small. Thus, it is possible to use as the operational amplifier one close to an ideal operational amplifier that receives equal potentials as the input voltages thereto. This helps obtain a high gain in the operational amplifier, and thus helps increase the response of the feedback loop and thereby enhance the transient characteristic of the output voltage against an abrupt variation in the output current.

In the power supply apparatus configured as described above, advisably, the constant-impedance controller includes: a first resistor connected between one input terminal of the operational amplifier to which the output voltage is applied and the output terminal of the operational amplifier; and a second resistor connected between the one input terminal of the operational amplifier to which the output voltage is applied and the terminal to which the output voltage is applied. Here, by producing a voltage difference commensurate with an increase or decrease in the output current across the first resistor between the voltage at the one input terminal of the operational amplifier and the voltage at the output terminal thereof, the current that flows from the first resistor to the second resistor is varied. With this configuration, the DC characteristic of the output voltage with respect to the output current can be set simply by appropriately setting the ratio between the resistances of the first and second resistors, and does not depend on the gain characteristic of the operational amplifier. Thus, there are very few factors that cause the output voltage to vary. Thus, even when the permissible variation range of the output voltage is narrow, the output voltage can be controlled accurately to vary within the permissible variation range.

In the power supply apparatus configured as described above, advisably, the constant-impedance controller uses the reference voltages as a current setting reference voltage with reference to which the constant-impedance controller determines the correlation between the voltage at the output terminal of the operational amplifier and the magnitude of the offset. With this configuration, even if a variation occurs in the reference voltage, it has no influence whatsoever on the correlation characteristic of the magnitude of the offset with respect to the output current.

Alternatively, in the power supply apparatus configured as described above, advisably, the output voltage comparator includes: an amplifier that amplifies the differential voltage between the output voltage and a first reference voltage; a pair of resistors that are serially connected between two different potentials so as to bias the voltage amplified by the amplifier; and a voltage-to-current converter that converts the amplified and then biased voltage into a current to produce a setting signal by which the magnitude of the offset is set. With this configuration, it is possible, with a simpler configuration, to obtain almost the same advantages as those achieved by the differently configured power supply apparatuses described above. The power supply apparatus of this configuration, however, also has many disadvantages as compared with the differently configured power supply apparatuses, and therefore due caution needs to be exercised when this configuration is adopted.

What is claimed is:

1. A power supply apparatus comprising:
   an output current detector that produces a monitoring voltage commensurate with an output current;
   a comparator that changes an output level thereof according to whether or not the monitoring voltage is higher than a predetermined threshold level;
   an output controller that controls an output voltage based on an output signal from the comparator;
   an offsetter that gives the monitoring voltage an offset; and
   an output voltage comparator that controls a magnitude of the offset according to a result of comparison between the output voltage and a predetermined reference voltage,
   wherein the output voltage comparator, in producing from an input voltage the output voltage within a predetermined permissible variation range, controls the magnitude of the offset in such a way that, as the output current increases, the output voltage decreases within the permissible variation range.

2. A power supply apparatus as claimed in claim 1, wherein the output voltage comparator includes:
   an operational amplifier that operates so as to make the output voltage and the reference voltage equal; and
   a constant-impedance controller that controls the magnitude of the offset according to an output terminal voltage of the operational amplifier and that produces a signal by which a target level of the output voltage is reduced within the permissible variation range as the output current increases.

3. A power supply apparatus as claimed in claim 2, wherein the constant-impedance controller includes:
   a first resistor connected between one input terminal of the operational amplifier to which the output voltage is applied and an output terminal of the operational amplifier; and
   a second resistor connected between the one input terminal of the operational amplifier to which the output voltage is applied and a terminal to which the output voltage is applied, and
wherein, by producing a voltage difference commensurate with an increase or decrease in the output current across the first resistor between a voltage at the one input terminal of the operational amplifier and the voltage at the output terminal thereof, a current that flows from the first resistor to the second resistor is varied.

4. A power supply apparatus as claimed in claim 3, wherein the constant-impedance controller uses the reference voltages as a current setting reference voltage with reference to which the constant-impedance controller determines correlation between the voltage at the output terminal of the operational amplifier and the magnitude of the offset.

5. A power supply apparatus as claimed in claim 1, wherein the output voltage comparator includes:
an amplifier that amplifies a differential voltage between the output voltage and a first reference voltage;
a pair of resistors that are serially connected between two different potentials so as to bias the voltage amplified by the amplifier; and
a voltage-to-current converter that converts the amplified and then biased voltage into a current to produce a setting signal by which the magnitude of the offset is set.

6. A power supply apparatus as claimed in claim 1, wherein a target level of the output voltage is decreased at a fixed ratio.

7. A power supply apparatus as claimed in claim 1, wherein, when the output current abruptly increases, the output voltage is kept at a decreased voltage level.

8. A power supply apparatus as claimed in claim 1, wherein the output controller includes:
   a pair of output transistors connected in series between two different potentials so as to act as switching devices, the output voltage being derived from a node between the output transistors;
   a flip-flop that receives, at a reset terminal thereof, the output signal of the comparator and that receives, at a set terminal thereof, a clock signal having a predetermined frequency; and
   an output transistor drive circuit that drives the pair of output transistors according to an output signal of the flip-flop.

9. A power supply apparatus as claimed in claim 1, wherein the output controller includes:
   an output transistor connected directly between an input terminal via which the input voltage is fed in and an output terminal via which the output voltage is fed out, the output transistor being turned on and off according to the output signal of the comparator.

* * * * *